United States Patent [19]

King

[11] Patent Number: 4,916,444
[45] Date of Patent: Apr. 10, 1990

[54] METHOD AND APPARATUS FOR MAPPING COMMUNICATIONS MEDIA

[76] Inventor: Fred N. King, 1930 Lake Port Way, Reston, Va. 22091

[21] Appl. No.: 174,280

[22] Filed: Mar. 25, 1988

[51] Int. Cl.$^4$ .......................... H04Q 9/00; G01R 31/02
[52] U.S. Cl. .......... 340/825.490; 340/825.360825.500; 324/66; 379/25; 370/85.12
[58] Field of Search ............... 379/25, 26, 29; 370/58, 370/86, 88; 324/66; 340/825.44, 825.76, 825.48, 825.50

[56] References Cited

U.S. PATENT DOCUMENTS

| | | | |
|---|---|---|---|
| 3,004,105 | 10/1961 | Grodale et al. | 179/6.3 |
| 3,287,509 | 11/1966 | Bohnenblust | 179/175.3 |
| 3,601,561 | 8/1971 | Bennett | 179/175.3 |
| 3,663,796 | 5/1972 | Boatwright et al. | 179/175.3 |
| 3,681,686 | 8/1972 | Connally | 324/66 |
| 3,699,274 | 10/1972 | Bennett | 379/25 |
| 3,742,350 | 6/1973 | White | 324/66 |
| 3,891,811 | 6/1975 | Miller | 179/175.3 A |
| 3,902,026 | 8/1975 | Rogers et al. | 179/175.3 A |
| 4,054,759 | 10/1977 | McGrath et al. | 379/29 |
| 4,143,250 | 3/1979 | Simokat | 179/175.3 R |
| 4,204,094 | 5/1980 | Cepelinski | 179/18 FA |
| 4,384,249 | 5/1983 | Medina | 324/51 |
| 4,394,543 | 7/1983 | Keiper, Jr. et al. | 179/84 R |
| 4,434,328 | 2/1984 | Fields | 179/20 |
| 4,445,086 | 4/1984 | Bulatao | 324/66 |
| 4,456,790 | 6/1984 | Soyack | 179/18 ES |
| 4,521,643 | 6/1985 | Dupuis | 179/2 DP |
| 4,550,225 | 10/1985 | Lynch et al. | 179/81 R |
| 4,578,636 | 3/1986 | Bakke et al. | 324/66 |
| 4,603,235 | 6/1986 | Crabbe, Sr. | 379/290 |
| 4,620,282 | 12/1986 | Shelley | 364/489 |
| 4,626,633 | 12/1986 | Ruehl et al. | 379/27 |
| 4,716,408 | 12/1987 | O'Connor et al. | 340/825.50 |
| 4,734,638 | 3/1988 | Weber | 324/66 |
| 4,748,402 | 5/1988 | Sellati | 324/66 |
| 4,811,358 | 3/1989 | Smedley et al. | 370/58 |

OTHER PUBLICATIONS

Hewlett Packard, "Pair Identifier System Models 4960B/4961", 11/79.

Primary Examiner—Donald J. Yusko
Assistant Examiner—Brian S. Palladino
Attorney, Agent, or Firm—Sughrue, Mion, Zinn, Macpeak & Seas

[57] ABSTRACT

An apparatus and method for the efficient generation of a wiring map of the connectivity between two sets of terminals at different locations which have established communication links between respective terminals at the two locations. A single at a first location uniquely identifies each of the terminals, by code, frequency, sequence of connection or the like, and is transmitted to a respective terminal at the second location via a respective communication link. The terminals at the second location are sampled and the presence of the transmitted signal correlated to the identity of the first terminal. The correlation may be direct, as by unique terminal identifier, or by a comparision of data bases stored by computers. First and second data bases, each relating the terminal locations to the transmitted information, respectively, are correlated to create a third data base used to generate a map of the linked terminals.

20 Claims, 8 Drawing Sheets

STEP 1

PHYSICALLY PLACE AND CONNECT CODE GENERATORS AT DISPER LOCATIONS WHICH ARE CONNECTED BY A COMMUNICATIONS MEDIUM TO A CENTRAL LOCATION.
RECORD PHYSICAL LOCATION AND CODE OF EACH CODE GENERATOR AND STORE IN THE MICROCOMPUTER AS DATA BASE 1.

STEP 2

CONNECT SEQUENTIAL SWITCH AND CODE STORAGE DEVICE TO TERMINATIONS AT CENTRAL LOCATION AND TO MICROCOMPUTER THROUGH ITS SERIAL PORT.
RECORD AS DATA BASE 2 IN THE MICROCOMPUTER THE CODE AND PHYSICAL LOCATION, OR ITS EQUIVALENT, ASSOCIATED WITH EACH TERMINATION.

STEP 3

COMPARE DATA BASES 1 AND 2 WITH THE MICROCOMPUTER TO GENERATE DATA BASE 3 WHICH RELATES PHYSICAL LOCATION OF EACH CODE GENERATOR WITH A CORRESPONDING TERMINATION AT THE CENTRAL LOCATION.

METHOD AND APPARATUS FOR MAPPING COMMUNICATIONS MEDIA

BACKGROUND OF THE INVENTION

1. Field Of Invention

This invention relates to the management of wiring and other communications media commonly used in buildings, office parks and campuses for telephone, data and video communications.

2. Description Of Prior Art

In many office buildings, when new tenants move in or the communications requirements of existing tenants change, new communications wiring is installed. New wiring is preferred in many cases despite the existence of already installed wiring which could meet the new requirements and despite the significant expense involved in installing new wiring. One reason that new wiring is often installed is that records identifying the termination points of the existing wiring frequently do not exist or, if such records have been established, their current accuracy is questionable. This problem has become exacerbated by the divestiture of the Bell system, which previously managed this record keeping function, and the assumption of wiring management responsibilities by building owners and tenants. Often, such owners or tenants do not have the skill or the facilities to satisfactorily perform this management function.

Three methods previously have been employed to create new wiring records or to verify old records. One method is a trial and error process that requires personnel to use test equipment at both ends of each and every wire pair to identify the termination points. This process is quite labor intensive and, hence, expensive. The second method is a variation of the first method and involves the use of equipment at a central location that can be controlled by a test person at a remote location to identify specific wire pairs which connect the central and remote locations. This process is also labor intensive and potentially obtrusive in that it requires the test person to go to each remote location to perform the associated tests. The third method, typically applicable only to telephone systems, is to place a test call from the central location to the remote location and to await an answer from a person at that remote location who can provide identification information. However, this latter method usually is either unacceptably obtrusive or, if no one is present at the remote location, inconclusive.

As a result, it has been found that even at the current cost of new wiring, it is often preferable to install new wiring whose termination points are identified during the installation process, rather than to recreate or verify the records for existing wiring.

OBJECTS AND ADVANTAGES

Accordingly, the principal object of the invention is to provide a process for obtaining economically, automatically and unobtrusively a complete map or equivalent record of installed communications wiring or other communications media within a defined geographical area. In contrast to the labor intensive methods currently used, the operation of the invention requires only one semi-skilled person at a central location. Further economic advantages of the invention are that it can provide the necessary information quickly and that it uses inexpensive components. In addition, it can be used continuously and economically to update changes in connections as they are made. As a result, the use of the invention is substantially less expensive than installing new wiring. It also provides a less expensive way to verify existing wiring than current manual methods. In addition, the basic method and apparatus of the invention can be used to monitor the quality of performance and maintenance of wiring or other communications media on an ongoing basis.

Further objects and advantages of the invention will become apparent from a consideration of the drawings and the description of the preferred embodiments.

SUMMARY OF THE INVENTION

The present invention is a method and apparatus for establishing and maintaining an accurate map of communications lines connected between remote locations and a central location within a defined communications area. In accordance with the invention, a code generator that can produce a selectable unique code is placed at the remote termination point of each communications line, preferably at the equipment jack. At the central junction box or wiring closet where all lines terminate, a sequential switch and code storage device is connected to each of the communication lines and forms the opposite terminus end of the line. The sequential switch successively gates from each line into the storage device the code signals received from the remote code generators. These codes uniquely identify each code generator with a particular termination at the central location. A data base that identifies each code generator with a particular remote location is compared to a data base that identifies each code signal with a particular terminal at the central location. The two data bases are correlated and identify for each central terminal a particular remote location.

DESCRIPTION OF THE PREFERRED EMBODIMENTS

The invention is a method and apparatus which, in its preferred embodiments, involves a combination of digital electronic circuitry, a microcomputer and associated computer programs that control the execution of certain test and operational procedures.

Figure 1:
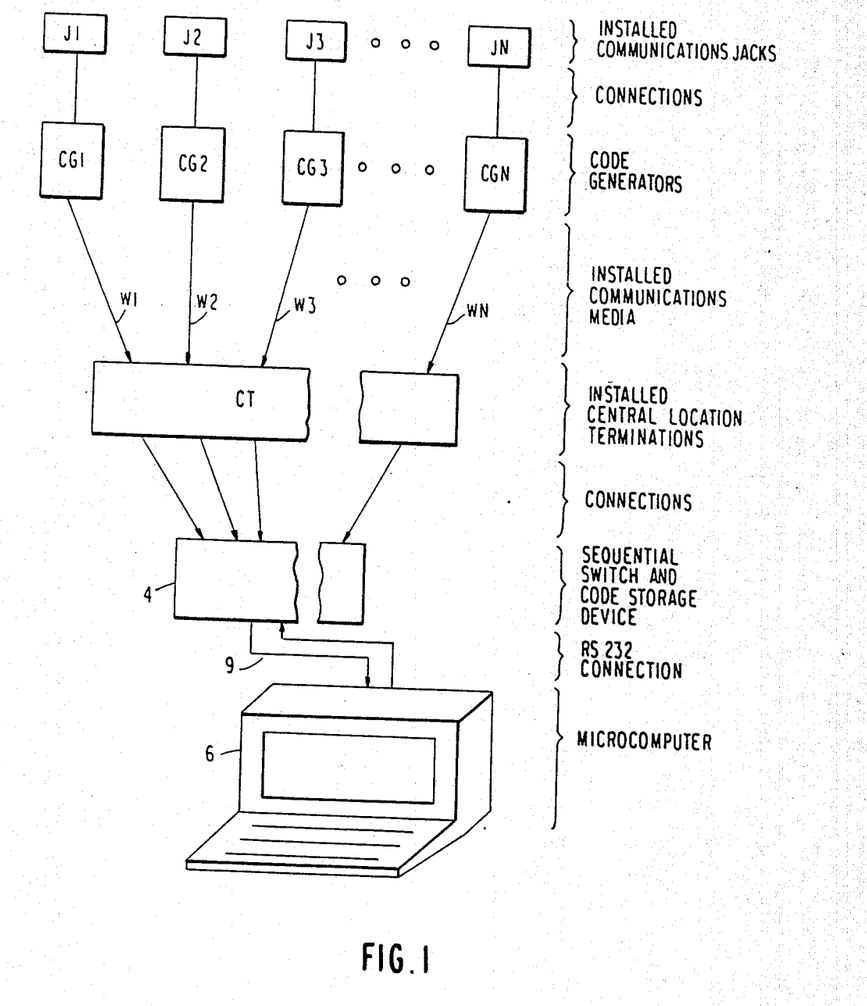
FIG. 1 shows a block diagram of the major components of the invention.

FIG. 1 shows the major components of the invention, operative in its intended environment. Code generators ($CG_1, CG_2, \ldots GC_N$), each of which generates a unique code, are physically located at and connected to communications jacks ($J_1, J_2 \ldots J_N$) which are typically located in the walls of offices in an office building. Alternatively, in cases where jacks and their associated communication devices have a known and fixed relationship, the code generators could be located in the associated communications devices. Each jack is connected via respective wiring, ($W_1, W_2, \ldots W_N$) or comparable installed transmission media (e.g., optical cable) to a central location termination block CT in a wiring closet. As used herein, the term "wiring closet" is intended to refer generally to a central location to which communications wires or other transmission media are brought from the communications jacks and may include, for example, switching apparatus such as a private branch exchange (PBX). Code generator signals typically, but not necessarily, share with the communications information the same wires or transmission media from the code generators to the central location termination block. Clearly, dedicated wiring or other transmission media may be used if desired.

A sequential switch and code storage device 4 also is located in the wiring closet. The sequential switch and code storage device 4 is typically connected by a standard connector to the dedicated or shared wiring at the terminations in the wiring closet. A microcomputer 6, or its functional equivalent, may be located in the wiring closet or some other convenient location. Cabling 9, connects the microcomputer through its serial port to the sequential switch and code storage device 4 in order to facilitate the exchange of control signals and code information. In addition, the microcomputer 6 stores certain data bases and an applications program to process the data bases.

Figure 2:
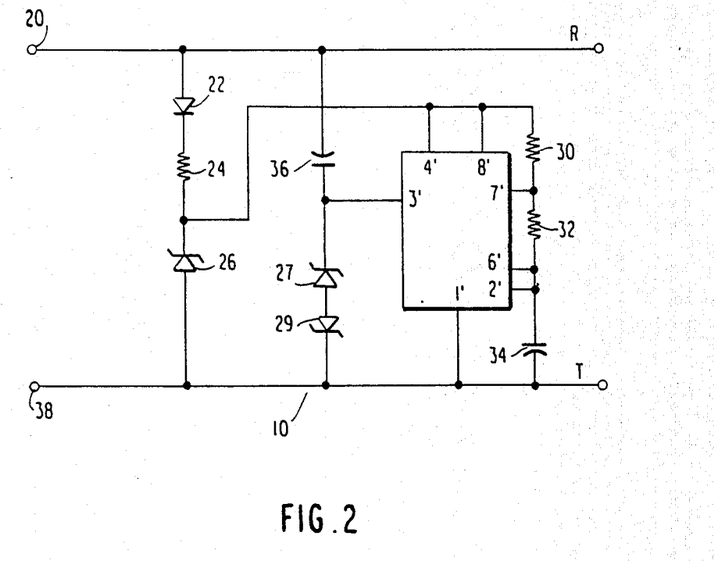
FIG. 2 shows the preferred embodiment of a code generator.

Code Generator: FIG. 2 shows the preferred embodiment of the code generator 10 in a typical telephone wiring environment with a tip lead 38 and a ring lead 20. The major component of the code generator is a square wave clock generator 28 which can be a standard integrated circuit, such as a type 555, having conventional pin locations 1', 2', 3', 4', 6', 7' and 8'. Two series-connected resistors 30 and 32, which are tied in common to pin 7' and a capacitor 34, which is connected between a common connection of pins 2' and 6' and ring lead 38, are sized to determine the frequency of the clock signal. Blocking diode 22 is connected to ring lead 20 and acts to prevent the code generator from drawing current while the communications lines are in normal use. Voltage dividing resistor 24 and zener diode 26, which derive a dc supply voltage to operate the integrated circuit, are connected between blocking diode 22 and tip lead 38. An output coupling capacitor 36 is connected between the ring lead 20 and pin 3' of the clock generator 28. Zener diodes 27 and 29 are connected in series between pin 3' and tip lead 38. The diodes act to protect the integrated circuit from high voltages on the communications lines such as those caused by ringing signals. In the preferred implementation, power is supplied to the code generator (10) from the central location with a voltage that is of reverse polarity with respect to the typical −48 volts dc on the ring lead 20 and ground on the tip lead 38.

In this preferred embodiment of the code generator 10, the operational frequency may be varied by selectively sizing the generator components in a manner know in the art. The operational frequency of each individual code generator used in the invention is the unique code that distinguishes one jack from another. In selecting a range of code generator frequencies, several considerations apply. First, the number of discrete code frequencies should be equal to or greater than the number of terminations of the communications media at the central location. For voice communications in a typical office building, for example, there are typically 50–100 such terminations in each wiring closet. Accordingly, a similar number of discrete code frequencies are required. Second, the frequency difference between individual code frequencies should be significantly greater than the precision to which individual frequencies are controlled.

In the case of the code generator of FIG. 2, for example, the precision of individual frequencies is a function of:

the precision of the resistance values of resistors 30 and 32 and the capacitance value of capacitor 34, the magnitude of ambient temperature changes, and the precision of the zener voltage in the power supply.

A reasonable budget for frequency variations due to each of these causes in a typical application is:

| | |
|---|---|
| resistance and capacitance: | +/−2.0% |
| temperature changes: | +/−2.25% |
| power supply variations: | +/−0.25% |
| Total: | +/−2.5% |

Ordinarily, a requirement that individual code frequencies differ by at least 5–10% will be sufficient to provide unambiguous results.

Sequential Switch And Code Storage Device: There are two desirable features of the sequential switch and code storage device 4. First, the switch should be able to successively gate into the storage device the code signals from the communications lines terminated at the central location. Second, the device should provide a means to read the stored codes into the memory of a microcomputer at a rate which is compatible with the ability of the microcomputer to process data.

The sequential switch and code storage device 4 has inputs from two sources, one of which is the group of connections to the communications lines $W_1$-$W_N$, or a convenient subset thereof, terminated at the central location CT and the other is the microcomputer 6 which provides control signals. The sequential switch and code storage device 4 also provides control signals to the microcomputer 6.

Figure 3:
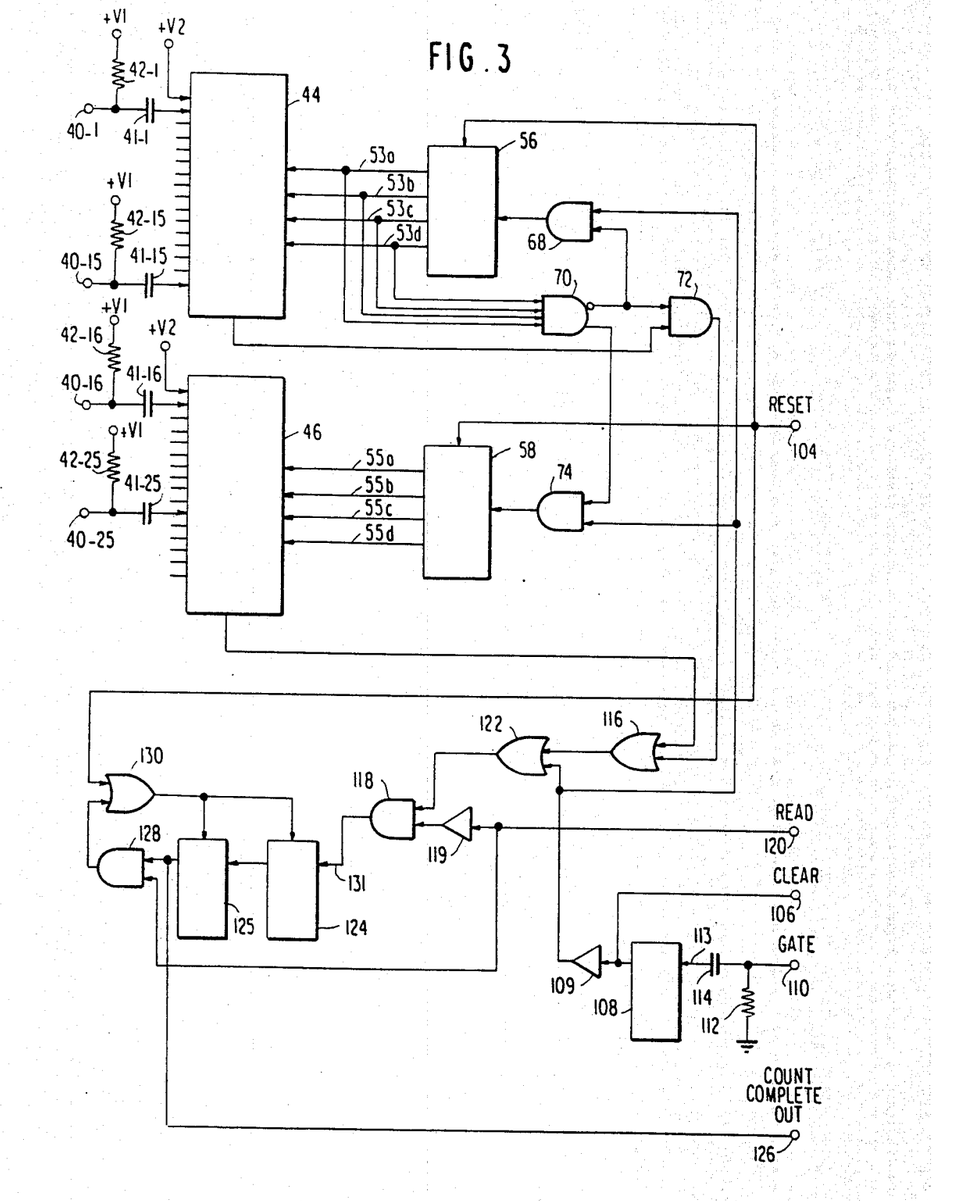
FIG. 3 shows the preferred embodiment of a sequential switch and code storage device.

FIG. 3 shows a preferred embodiment of the sequential switch and code storage device CT. The configuration shown assumes a communications network having two hundred and fifty jacks, each having a dedicated code generator, connected by the same number of lines to a like number of terminations at a central location. Thus in the system illustrated in FIG. 1, N has been made equal 250 for illustrative purposes, although it would be clear to one of ordinary skill in the art that an arbitrary number could be accommodated.

In FIG. 3, it is assumed that the sequential switch and code storage device 4 has twenty five input terminals 40-1 through 40-25. In practice, the two hundred and fifty terminations are connected twenty five at a time, in ten separate groups, to the twenty five input terminals 40-1 through 40-25 of the sequential switch and code storage device 4. For clarity, only four of the code input terminals 40-1, 40-15, 40-16 and 40-25 are shown. The first fifteen code inputs 40-1 through 40-15 are connected to inputs 2 through 16 of data selector 44 via d-c blocking capacitors 41-1 through 41-15. Input 1 of data selector 44 is connected to a positive d-c supply voltage V2. Resistors 42-1 through 42-15 are connected to a second d-c supply voltage V1 and to code input terminals 40-1 through 40-15, respectively, to supply d-c current to the code generators CG while not significantly attenuating the code signals.

Code input terminals 40-16 through 40-25 are similarly connected through d-c blocking capacitors 41-16 through 41-25 respectively to inputs 2 through 11, respectively, of data selector 46. Input 1 of data selector 46 is also connected to supply voltage V2 while inputs 12 through 16 are not used. Resistors 42-16 through 42-25 are connected in a manner similar to resistors 42-1 through 42-15 and have a similar function.

Data selectors 44 and 46 can be standard integrated circuits such as type SN54150 which gate one of sixteen inputs to output lines 45 and 47 respectively. Which of the sixteen is gated to the output at a particular point in time is determined by the binary code on the control input lines. For example, a code of 0000 on lines 53a, 53b, 53c and 53d gates the first input of data selector 44 to its output line 45. The control inputs to the data selectors are driven by negative going edge triggered modulo 16 counters 56 and 58 which, for example, can be standard integrated circuits type SN5493A. AND gate 70 senses when counter 56 has reached a full count of sixteen (binary 1111) at which time further inputs from the INVERTER 109 to counter 56 through AND gate 68 are inhibited.

The outputs 45 and 47 of the data selectors 44 and 46 respectively are sequentially passed through AND gates 72 and 78, respectively, to OR gate 116. The sequential counting process is such that only one of the inputs to OR gate 116 will be active at any one time and, because the data selectors 44 and 46 provide logical inversion between input and output, the non-active input to OR gate 116 will be a logical zero. The passage of the signal at the output of OR gate 116 through OR gate 122 is controlled by the output of the INVERTER 109 which, in turn, is controlled by monostable multivibrator 108. The latter device can be a standard integrated circuit such as type 555.

The duration of the pulse generated by monostable multivibrator 108 is controlled by parameter values of a resistor and capacitor in a manner well known in the art. The pulse is initiated by a negative going external signal applied to the trigger input 113. Resistor 114 and capacitor 113 differentiate the typically square GATE pulse, which comes from the microcomputer 6 via terminal 110, to ensure that the width of the GATE pulse does not influence the duration of the pulse generated by the monostable multivibrator 108. The output of the monostable multivibrator 108 is also made available to the microcomputer 6 as the control signal CLEAR through terminal 106. When a logical one is generated by monostable multivibrator 108, a complementary logical zero is presented at the output of INVERTER 109 which, in turn, is an input to OR gate 122. Code signals at the output of OR gate 116 pass through OR gate 122 when the output of monostable multivibrator 108 is a logical one. At all other times the output of OR gate 122 is a logical one. The output of OR gate 122 is applied to one input of AND gate 118 and is passed through as input 131 to frequency divider 124 when the READ input on terminal 120 is a logical zero which, in turn, causes the output of INVERTER 119 to be a logical one.

Frequency divider 124 can be an industry standard integrated circuit type SN55456. It has an output when fifty high to low transitions of the input signal have occurred. The output of frequency divider 124 is connected in cascade with frequency divider 125, which can be a type SN5456. With the cascade connection shown, frequency divider 125 will have an output when two hundred and fifty high to low transitions have occurred at the input 131 of frequency divider 124. Frequency dividers 124 and 125 are reset by either of two conditions. One condition is the presence of a logical one RESET control signal from the microcomputer received on terminal 104 and applied through OR gate 130. The other condition is the presence of a logical one READ signal received on terminal 120 and applied to AND gate 128 and, subsequently, to OR gate 130, if the output of frequency divider 125 indicates that a count of two hundred and fifty has been reached thereby enabling the other input of AND gate 128.

Figure 4:
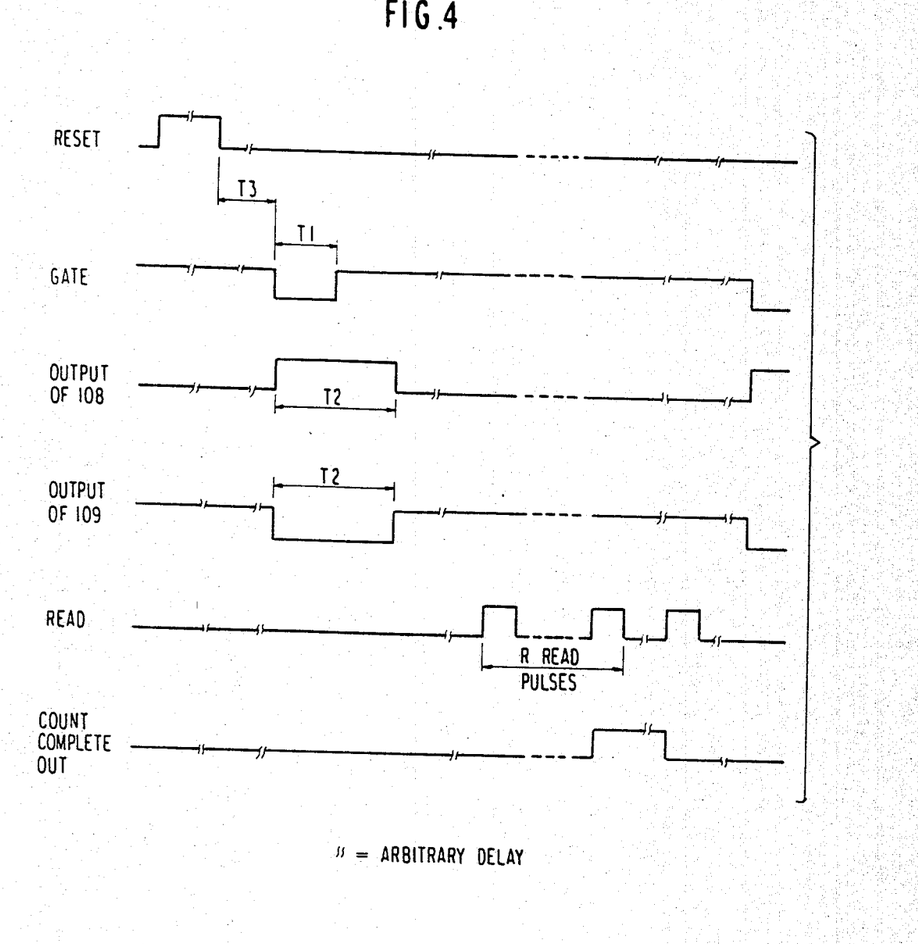
FIG. 4 shows a timing diagram of the control signals which flow between the microcomputer and the sequential switch and code storage device.

The operation of the sequential switch and code storage device 4 may be illustrated with the aid of the timing diagram of FIG. 4. Operation begins with initiation by the microcomputer 6 of a logical one RESET signal. The RESET pulse has a minimum duration equal to that required to reset counters 56 and 58 and frequency dividers 124 and 125. Typically this time can be on the order of fifty nanoseconds. The RESET pulse can be arbitrarily longer than this minimum.

The application of the RESET pulse to the circuitry of FIG. 3 through terminal 104, with READ input 120 and GATE input 110 both at logical zero, sets all outputs of the counters 56 and 58 to logical zeros. The RESET pulse also ensures that the output of OR gate 130 is a logical one which, in turn, resets frequency dividers 124 and 125. One consequence of resetting frequency dividers 124 and 125 is that COUNT COMPLETE OUT 126 is a logical zero.

This set of conditions, in turn, produces logical zeros at the normal outputs of AND gates 70, 72, 74 and 128 and OR gate 116. At the same time, the outputs of INVERTERs 109 and 119, OR gates 122 and 130 and AND gates 68 and 118 are logical ones. Subsequently, during time T3 of FIG. 4, when the RESET pulse has returned to a logical zero and all other control signals remain logical zeros, the only change in logic state in the circuitry of FIG. 3 is that the output of OR gate 130 changes to a logical zero.

Following an arbitrarily long delay after the end of the RESET pulse, a logical zero GATE pulse is generated by the microcomputer 6 and applied to terminal 110 of FIG. 3. This GATE pulse is differentiated by capacitor 113 and resistor 112 and the result triggers monostable multivibrator 108.

The required duration T2 of the pulse generated by monostable multivibrator 108 is a function of the relationships among the code generator frequencies. In one such relationship of interest, the code generator frequencies are separated by a fixed percentage. In particular, if the lowest code generator frequency is one KHz and the fixed percentage is five percent, then it can be shown that the minimum duration of T2 is 20 milliseconds. In other words, it will take a time interval of 20 milliseconds for a 1.05 KHz code to produce one more count than a 1.00 KHz code. To minimize the count requirements for frequency dividers 125 and 125, the amount by which the duration of T2 exceeds the minimum requirement should be as small as practicable.

The output of INVERTER 109 is a logical zero of duration T2. Referring to FIG. 3, the change of the output of INVERTER 109 to a logical zero causes AND gate 68 to change to a logical zero. When AND gate 68 changes to a logical zero, counter 56 will increment by one to a binary output of 0001 on output lines 58d, 58c, 58b and 58a respectively. This code applied to the control inputs of data selector 44 gates the logical complement of the first input code on terminal 40-1 to the output 45 of the data selector 44. This code is subsequently passed unaltered through AND gate 72, OR gate 116, OR gate 122 and AND gate 118 to the input 131 of frequency divider 124. Cascaded frequency dividers 124 and 125 then increment by one for each high to low transition of the input code until the output of monostable multivibrator 108 changes to a logical zero. The count contained in cascaded frequency dividers 124 and 125 is then the number of high to low transitions of the first input code in a known period of time T2. In other words, this count can be used to uniquely identify the first input code.

To extract the count stored in frequency dividers 124 and 125, a series of R logical one READ pulses are initiated by the microcomputer 6 after an arbitrarily long delay as indicated in FIG. 4. The duration of the READ pulses should be sufficient to reliably operate the logic circuitry of FIG. 4. The READ pulses are continued until the output of frequency divider 125 changes to a logical one. When the number R of READ pulses required to make this happen is subtracted from two hundred and fifty, the result is equal to the number of high to low transitions of the first input code in time T2. The output of frequency divider 125 is made available to the microcomputer 6 through the COUNT COMPLETE OUT terminal 126. After the microcomputer 6 determines that a COUNT COMPLETE OUT signal has been generated, one more READ logical one pulse is sent. This READ pulse passes through AND gate 128 and OR gate 130 and resets frequency dividers 124 and 125.

To process the second input code, after an arbitrary delay as shown in FIG. 4, a second GATE pulse is generated by the microcomputer 6 and applied to the sequential switch and code storage device 4 at terminal 110. Subsequent logical operations are the same as those described for processing the first input code except, that in this case, the counter 56 is incremented from one to two (binary 0001 to 0010 on lines 53d, 53c, 53b and 53a, respectively). This change, in turn, gates the logical complement of the second input code on terminals 40 to the output 45 of data selector 44. As is the case for the first input code, the count of high to low transitions for the second code input is stored in the cascaded frequency dividers 124 and 125. Also, as is the case for the first input code, the number of READ pulses required to produce a COUNT COMPLETE OUT signal is used to determine the count of high to low transitions for the second code input.

This cycle is repeated until all fifteen code inputs to data selector 44 have been processed and, as a result, the output of counter 56 is sixteen (binary 1111 on lines 53d, 53c, 53b and 53a respectively). The count of sixteen will remain sixteen until reset by an external reset pulse. This condition, where the output of the counter is sixteen, will cause the normal output of AND gate 70 to become a logical one thereby enabling AND gate 74 to pass the sixteenth logical one pulse from INVERTER 109. At the same time, the complementary output of AND gate 70 will become a logical zero which inhibits the passage of the sixteenth and subsequent GATE initiated pulses from INVERTER 109 from passing through AND gate 68.

The passage of the sixteenth logical one pulse from INVERTER 109 through AND gate 74 increments the count in counter 58 from zero to one (binary 0000 to 0001 on lines 55d, 55c, 55b and 55a respectively). This condition, in turn, causes the complement of the code input to terminal 40-16 to appear at the output 47 of data selector 46. This code is subsequently stored in cascaded frequency dividers 124 and 125 and decoded with READ pulses in the same manner as that described for code signals passing through data selector 44. The remaining code inputs on terminals 40-17 through 40-25 are processed in a similar manner.

Microcomputer: The microcomputer 6 sends control signals to the sequential switch and code storage device 4; it also receives a CLEAR to send signal and code signals from the sequential switch and code storage device 4 via lines 9. In the preferred embodiment, the microcomputer 6 also provides an identification of the specific communication line terminations from which a given code is being received. In addition, it stores two data bases and a processing program which it uses to combine the two data bases to form a third data base.

Figure 5:
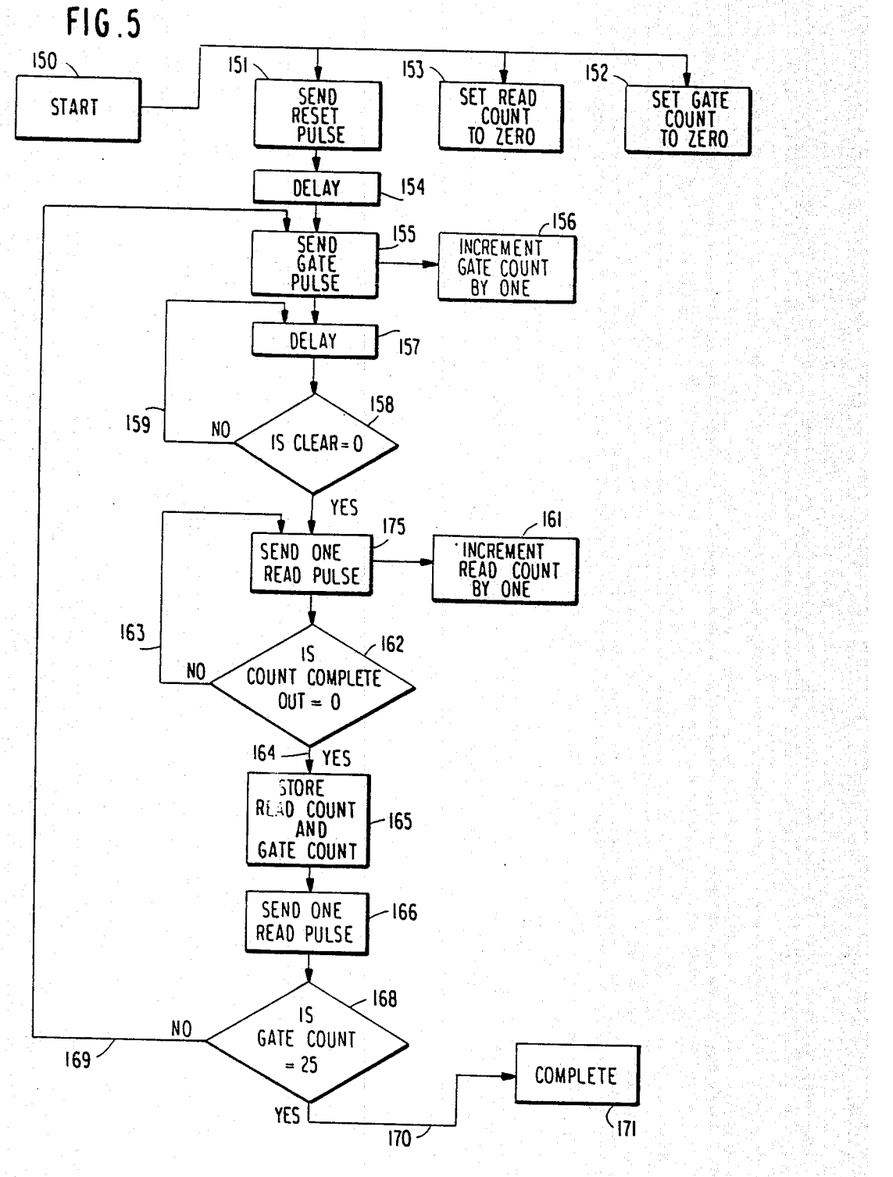
FIG. 5 shows a flow diagram of the computer program which controls the sequential switch and code storage device and which receives data from it.

FIG. 5 shows a flow diagram of the computer program which generates control signals for the sequential switch and code storage device 4. Upon receiving a START signal (step 150), typically from a keyboard, a RESET pulse is sent (step 151) and both the GATE count (step 152) and READ count (step 153) are set to 0. Following a delay (step 154), which is arbitrarily longer than that required to reset the counters of the sequential switch and code storage device 4 (FIG. 3), a GATE pulse is generated (step 155) and at step 156 the GATE count is incremented by 1. Following a second delay (step 157), which is arbitrarily longer than the time required for the timer circuit (FIG. 3) to be triggered, a test is made (step 158) to determine whether the timer pulse is "off" (if so, CLEAR=0). If the timer pulse is "on", (step 159) the test is repeated with an additional delay until the timer is "off" (CLEAR=1). When the timer is "off" (step 160), a READ pulse is sent (step 175) and the READ count is incremented by 1 at step 161. The COUNT COMPLETE OUT terminal (FIG. 3) of the sequential switch and code storage device 4 is then tested (step 162). If COUNT COMPLETE OUT is not equal to one, (step 163) an additional READ pulse is generated (step 175) and the READ count is again incremented by one (step 161). This process is repeated until enough READ pulses have been applied to make the COUNT COMPLETE OUT equal to one (step 164). The READ count and GATE count are then stored (step 165). In the preferred embodiment of the sequential switch and code storage device 4 (FIG. 3), the number of READ pulses required to trigger the store steps is equal to 250 minus the number of code pulses which have been stored in the cascaded frequency divides 124 and 125 (FIG. 3). This READ count together with the associated GATE count (which identifies the communications line termination on which the code has been received) are stored as a record in a data base.

In the next step (166), an additional READ pulse is generated to reset cascaded frequency dividers 124 and 125. Next the GATE count is tested (step 168). If the GATE count is less than 25 (step 169), a GATE pulse is generated and the entire process is repeated. This continues until the GATE count is equal to 25 (step 170), at which time all 25 inputs have been read and stored and the process is completed (step 181).

Figure 6:
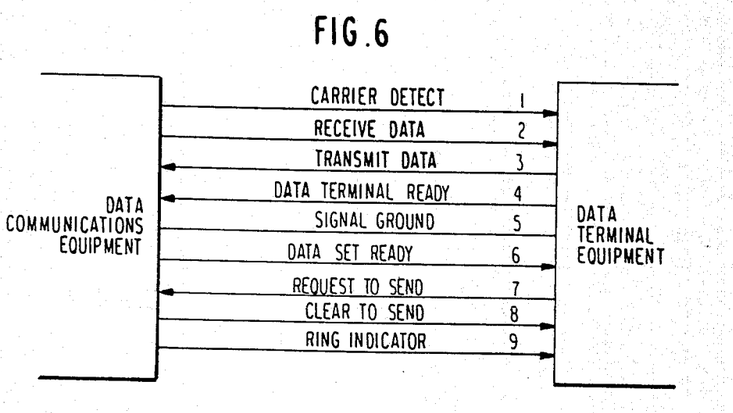
FIG. 6 shows standard RS232 connections.
Figure 7:
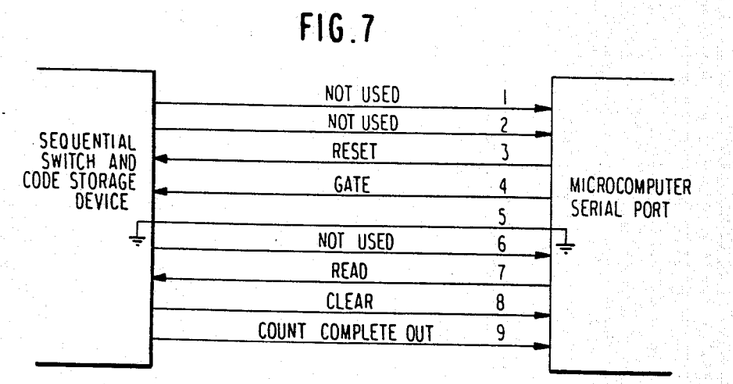
FIG. 7 shows specific RS-232 connections between the microcomputer and the sequential switch and code storage device.

Microcomputer Connections: The connections 9 between the microcomputer 6 and the sequential switch and code storage device 4 in the preferred embodiment are made through the serial port of the microcomputer. This port is typically a 9 pin RS-232 connection as shown in FIG. 6. FIG. 7 shows how these standard connections are related to the specific connections between the microcomputer 6 and the sequential switch and code storage device 4 used in the preferred embodiment.

Figure 8:
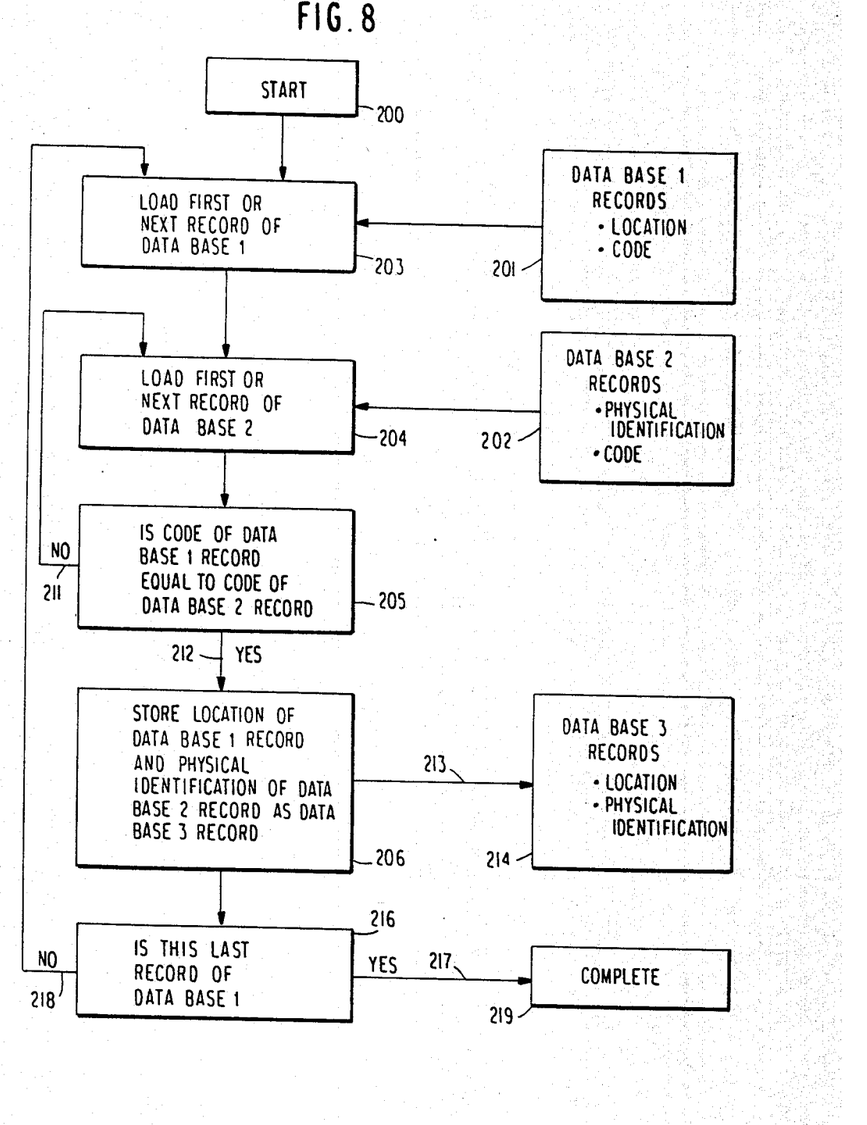
FIG. 8 shows a flow diagram of the computer program which generates Data Base 3 from Data Bases 1 and 2 and the content of the records of each data base.

Microcomputer Data Bases And Processing Program: FIG. 8 shows the content of typical records in Data Bases 1, 2 and 3. Also shown is a flow diagram of the computer program which is used to generate Data Base 3 from Data Base 1 and Data Base 2.

Data Base 1 is typically formed manually when the code generators are initially installed and connected and, typically is manually keyed into the microcomputer (step 201). Data Base 1 contains a correlation of remote location, identified in a conventional manner, such as by office number, wall or bulkhead designator or coordinate, with the unique code from a respective code generator at that location. Data Base 2 is formed when codes are read into the microcomputer from the sequential switch and code storage device (step 202). Data Base 2 contains a correlation of terminal identifiers, with the unique code read from that terminal. The identification of lines terminating at the central location may be by numbers or letters keyed to labels physically attached to the terminal for each line and readily identifiable by maintenance personnel.

The program used to generate Data Base 3 starts (step 200) with the loading of the first record of Data Base 1 (step 203) and the first record of Data Base 2 (step 204). The program then compares the two records to see if they have the same code (step 205). If not (step 211), the program sequentially examines the other records of Data Base 2 until it finds the one which does have the same code (step 212). It then writes a record (step 213) in Data Base 3 (214) which notes the corresponding physical location of code generator for the matched code and the identification of the communications line termination at the central location on which the code is present (step 206).

The program next determines if the current record of Data Based 1 is the last record (step 216). If not (step 218), the next record of Data Base 1 is loaded (step 203) and the process is repeated until all records of Data Base 1 have been examined (step 217), at which time the process is complete (step 219).

Data Base 3 is the result desired from the use of the invention. It is the equivalent of a map which relates the identified dispersed locations of installed communications jacks or connections to the specific connections at a central location, such as a wiring closet.

OPERATION OF THE PREFERRED EMBODIMENT OF THE INVENTION

Figure 9:
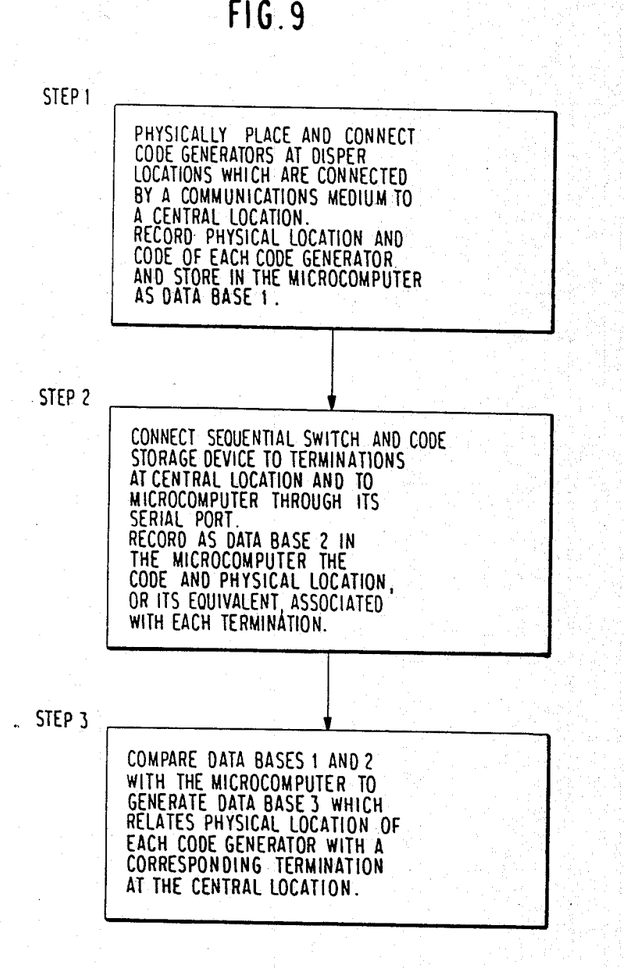
FIG. 9 shows a flow chart of a method which incorporates the invention.

FIG. 9 is a flow chart of the method of implementing the invention, consistent with the preferred embodiment, previously described in FIG. 1. Step 1 of the method is to physically place code generators ($CG_1$-$CG_N$) at each communications jack ($J_1$-$J_N$) which is to be mapped and to connect each of them to a communication path ($W_1$-$W_N$) which links the jack to the associated central location (CG). Each of these code generators generates a unique code. In the case of the preferred embodiment, the unique code is a unique frequency; however, alternative coding systems useable with the present invention would be known to one of ordinary skill in the art. As the code generators are installed, a data base is created which relates the unique code of each code generator to its unique location at a jack.

Step 2 of the method begins by connecting the inputs of the sequential switch and code storage device 4 to the terminations at the central location of the connections $W_1$-$W_N$) from the communications jacks ($J_1$-$J_N$). In the preferred embodiment, this physical connection may be made in several sequential steps. Also, in the preferred embodiment, associated connections to other communications paths, such as building risers, are removed for the mapping process.

Next, the sequential switch and code storage device 4 is connected to the microcomputer 6 which contains the control signal computer program. Operation of the process is initiated with a START signal from the keyboard of the microcomputer. As previously described, this initiates a process which generates Data Base 2.

The third step of the process is to compare the records of Data Base 1 and Data Base 2 that were generated in steps one and two respectively, in order to generate a third data base. Code is the common element of the records of the first two data bases. Therefore, by finding the records of both data bases which have the same code, as described at step 205 of FIG. 8, the records of the third data base which contain the physical locations of all communications jacks (from the first data base) and physical locations of the termination of the communications medium (from the second data base) can be formed.

The third data base is the desired result of the practice of the invention. It is the equivalent of a map which relates the physical locations of dispersed communications connections to their specific terminations at a central location.

Thus the communications media mapping process of the invention provides a substantially faster and more economical method for mapping dispersed communications connections and their associated terminations at a central location than has heretofore been possible.

The invention obviates the need to install new communications media in many cases and also provides timely and economical management of currently installed media.

Alternative Embodiments: There are many alternative embodiments for the method and apparatus of the preferred embodiment of the invention. For example, in the preferred embodiment of the code generator, typical connections to a riser system (and subsequently to a private branch exchange or telephone company central office) are opened during the mapping process and power is applied to the code generator from a dc power supply. In most cases, this will not be disruptive either because the locations being mapped are not in current use (e.g., prior to occupancy of office space by a new tenant) or because the mapping is being done after normal working hours. However, if desired, the code generator can be connected to operate continuously or between intervals of normal usage of the associated communications lines. If operated continuously, the code generator can draw operating power from the voltage normally available on a communications line or it could have its own battery or other power source. In such cases, if frequency is the code, the frequencies employed would typically be above or below the band of frequencies used for normal communications to prevent interference. Alternatively, a simplex connection such as that shown in U.S. Pat. No. 3,699,274 issued to Bennett on Oct. 17, 1972, could be used with code frequencies which are within the band of normal communications frequencies. Still another approach is to use a spare communications path in those cases where one is available and it is certain that the spare path and the normally used path connect the same points.

For operation between intervals of normal usage, possible connections of the code generator include those shown in the U.S. Pat. No. 3,663,796 to Boatwright et al issued May 5, 1972 and U.S. Pat. No. 4,054,759 McGrath et al and issued Oct. 18, 1977.

In addition, the invention is applicable to a wide range of communications media including (but not limited to) wire, coaxial cable, optical fibers and optical beams. For example, for coaxial cable, the preferred embodiment will work as described without significant modification. In an optical fiber or beam environment standard electro-optical couplers can be used to couple both the code generators and the sequential switch and code storage device to the fiber or beam medium. It should also be noted again that the code generator signals do not necessarily have to use the same communications medium as that of the communications system being mapped.

Depending on the specific communications medium, the components of the invention can be implemented by a wide variety of electronic, electromechanical, electro-optical and optical devices and manual methods.

Alternate embodiments of the code generator include those which are electronic, electro-optical or optical (such as a laser) and, additionally, each may employ a unique digital code, analog amplitude or frequency, or a modulated carrier signal.

Alternate embodiments of the sequential switch function of the sequential switch and code storage device include manual methods where, for example, a set of clip leads is moved manually from one set of terminations to the next. Alternatively, an electro-optical device mounted across each termination which converts the transmitted code to an optically detectable code may be employed. Optical detection can be accomplished visually, photographically or with a variety of electro-optical devices.

Decoding of codes is also possible in a wide range of embodiments. For example, if the code is frequency and if the frequency is low enough, then a voltmeter or similar device and a stop watch would enable manual detection of the codes by observing the time between meter needle swings. Alternatively, at almost any frequency, a standard frequency counter could be used. Still another possibility is to use an oscilloscope or comparable device to measure frequency or amplitude or to observe binary pit patterns.

The sequential switch and code storage device could also be made an integral part of a key system, private branch exchange, central office switch or other communications equipment.

Alternatives to a microcomputer for processing of the data bases associated with the invention include manual methods.

Accordingly, the scope of the invention is intended to be determined not only by the embodiments described and illustrated, but also by those alternative embodiments that would be known to one of ordinary skill in the art. While the preceding description contains many details, these should not be construed as limitations on the scope of the invention, but rather as an exemplification of one preferred embodiment thereof.

I claim:

1. A method, using computing means, of mapping the respective locations of a plurality of first terminals, comprising communications jacks, connections or devices installed at first locations, to respective second terminals at a second location, said first terminals being connected by a communications medium to said second terminals, comprising the steps of:

generating a unique signal at each first location, recording in said computing means first information identifying each said unique signal with the location of each device, transmitting each said unique signal by said communications medium from its respective first location to a second location, detecting said transmitted unique signal at its respective second location, identifying each unique signal with second information correlating the physical location of each connection at the second location, comparing, with said computing means, said first information obtained in said recording step and said second information obtained in said identifying step to create a third information which correlates the physical location of each first terminal to the physical location of the corresponding connection at the second location, thereby providing in said computing means a map of the communications medium which connects said first and second locations.

2. The method of claim 1 where the communications medium comprises at least one of a group consisting of transmission wire, optical fiber or coaxial cable; and said generating step comprises generating a unique signal comprising at least one of a group consisting of a unique square wave frequency, a digital code, and an analog signal with unique amplitude, frequency or modulation.

3. The method of claim 1 where the communications medium comprises at least one of optical fiber and optical beam; and the transmitting step is conducted by electronic, electro-optical or optical means and its associated unique signal comprises at least one of a group consisting of a unique square wave frequency, a digital code and an analog signal with unique amplitude, frequency or modulation.

4. A method, using computing equipment, of identifying from at least one location the physical locations of each of a plurality of first communications points, each of said points being connected to a respective one of a plurality of second communications points at said at least one location by a respective one of a plurality of communications links, comprising:

generating at each of said first communications points a unique identifier;

generating with said computing equipment a first data base identifying the location of each of said first communications points with said unique identifier;

transmitting from each of said first communications points to said respective second communications points said unique identifier;

receiving at each of said second communications points said unique identifier;

generating with said computing equipment a second data base identifying each of said second communications points with said unique identifier; and correlating with said computing equipment said first data base and said second data base and generating a third data base identifying for each of a plurality of said second communications points the location of the respective first communication points to which it is connected by one of said communication links.

5. The method of claim 4 wherein said transmitting step comprises the transmission of said unique identifier via the respective communication links connecting each first communications point to a respective communication point.

6. The method of claim 4 wherein said transmitting step comprises the transmission of said unique identifier via at least one link independent of and parallel to the respective communication links connecting each first communications point to a respective second communication point.

7. A method, using computing means, of correlating from at least one second location the physical locations of each of a plurality of first communications points, each of said first points being identified in a first data base by a first unique identifier, each of said first points being connected by a communications path to a respective one of a plurality of second communications points, each of said second points being identified by a second unique identifier, comprising:

transmitting from each of said first communications points to said respective second communications points said first unique identifier;

receiving at each of said second communications points said first unique identifier;

generating a second data base which correlates each of said second unique identifier with said first unique identifier; and correlating with said computing means said first data base and said second data base in order to generate a third data base identifying for each of a plurality of said second communication points the location of the respective one of the plurality of first communications points to which it is connected by one of said communications links.

8. The method of claim 7 wherein said transmitting step comprises the transmission of said first unique identifier via the respective communication links connecting each first communications point to a respective second communication point.

9. In a telecommunications system having first communications terminals at a plurality of first locations, second communications terminals at at least one second location and communications media connecting a respective pair of first and second terminals, said system further comprising:

signal generator means connectable to each of said first terminals and operative to generate signals uniquely identifying each of said first communications terminals;

transmission means connected between a respective one of said first communication terminals and a respective one of said second communication terminals and operative to transmit the signal output by said signal generator means from said first communication terminals to said second communication terminals;

second location means comprising a computer, said means being connectable to said second communications terminals and containing a first data base identifying the physical location of each first terminal with said unique signal, for receiving said transmitted signal output at said second communication terminals and for identifying each of said second communication terminals with the physical location of each first communication terminal to which it is connected.

10. The system of claim 9 wherein said second location means includes means for receiving the signal at each of said second communication terminals and generating a second data base identifying each signal with a second communications terminal means.

11. In a telecommunication system:

a plurality of first communication terminal means located at a plurality of remote locations;

a plurality of second communication terminal means located at a central location;

transmission means connecting respective pairs of said remote and central communication terminal means;

code generator means located proximate a respective one of said remote communication terminals means and operative to generate a code uniquely identifying each of said first communications terminals means;

central location means connected to said second communication terminal means for identifying for each of said second communication terminal means the remote location to which it is connected, said central location means comprising:

a switch and store means for receiving the unique code transmitted from a first communication terminal means to its respective second communication terminal means and identifying said code with said second communication terminal means; and a processor means having a first data base identifying the location of each of said first terminal means with a unique code generated by said code generator means located at said first communication terminal means and operative to use the identification of said unique code at said terminal means by said switch and store means to generate a correlation of each remote location and the corresponding second communications terminal means.

12. The system of claim 9, wherein said signal generator means comprises a separate generator connectable to a respective one of said first terminals.

13. The invention of claim 9 wherein said code is a unique frequency.

14. The invention of claim 9 wherein said code is an amplitude modulated on a carrier signal.

15. The invention of claim 9 wherein said code is a digital signal.

16. The invention of claim 9 wherein said first communication terminal comprises a jack.

17. The invention of claim 9 wherein said first communications terminal means comprises a telecommunications device, said device containing said code generator means.

18. The invention of claim 9 wherein said transmission means comprises one of the group consisting of wire, coax cable, optical fiber and laser beam.

19. The invention of claim 9 wherein the central location means in integrated with centralized switching equipment.

20. The telecommunications system of claim 11 further comprising means for generating said first data base.

* * * * *